United States Patent [19]
Gebbardt

[11] Patent Number: 4,832,559
[45] Date of Patent: May 23, 1989

[54] LOADING AND UNLOADING STATION FOR COMMERCIAL VEHICLES AND CONTAINERS

[75] Inventor: Gunter Gebbardt, Sinsheim, Fed. Rep. of Germany

[73] Assignee: Gebhardt Fordertechnik GmbH, Sinsheim, Fed. Rep. of Germany

[21] Appl. No.: 169,489

[22] Filed: Mar. 17, 1988

[30] Foreign Application Priority Data

Mar. 25, 1987 [DE] Fed. Rep. of Germany ....... 3709835

[51] Int. Cl.⁴ .............................................. B65G 67/04
[52] U.S. Cl. .................................. 414/392; 414/396; 414/398; 198/861.4
[58] Field of Search ............................ 414/390-393, 414/395, 396, 398, 278, 585, 400; 198/861.4, 589

[56] References Cited

U.S. PATENT DOCUMENTS

| | | | |
|---|---|---|---|
| 1,276,674 | 8/1918 | Mentzer | 414/396 |
| 2,102,248 | 12/1937 | Yeakel | 198/589 |
| 3,727,777 | 4/1973 | Hanson | 414/400 |
| 3,819,068 | 6/1974 | Weir | 414/392 X |
| 3,952,888 | 4/1976 | Currie | 414/400 |
| 4,425,069 | 1/1984 | Saur et al. | 414/398 |

FOREIGN PATENT DOCUMENTS

13271 2/1977 Japan .................................. 414/400

Primary Examiner—Andres Kashnikow
Assistant Examiner—Patrick N. Burkhart
Attorney, Agent, or Firm—Staas & Halsey

[57] ABSTRACT

The invention relates to a loading and unloading station for commercial vehicles and containers consisting of a travelling unit, a roller conveyor or chain conveyor, and a transport conveyor, wherein, in accordance with the invention, the transport conveyor and the roller conveyor or chain conveyor are swivel-mounted on the travelling unit and are designed to slide in transverse direction and can be adjusted in transverse and vertical direction. In this case, the travelling unit can be mounted on a stationary or a supporting structure to move in the direction of transport and transversely thereto. The travelling unit may also be equipped with a lifting mechanism to adjust the height of the chain and transport conveyor. Furthermore, the transport conveyor may be provided with support rollers that run transversely to the direction of transport. Finally, a height equalizer may be mounted on the supporting structure.

17 Claims, 2 Drawing Sheets

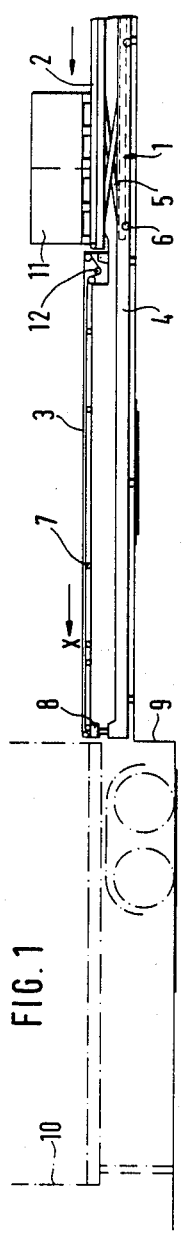
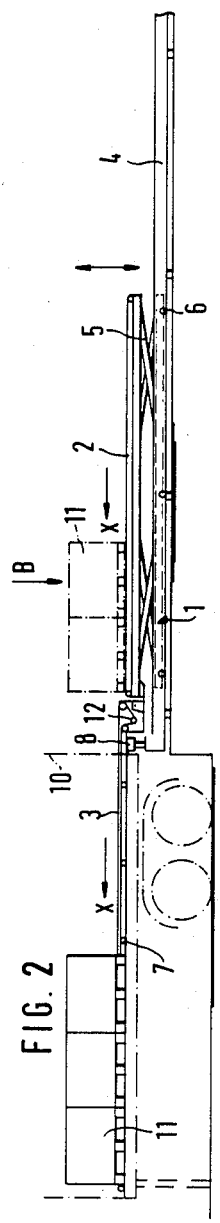
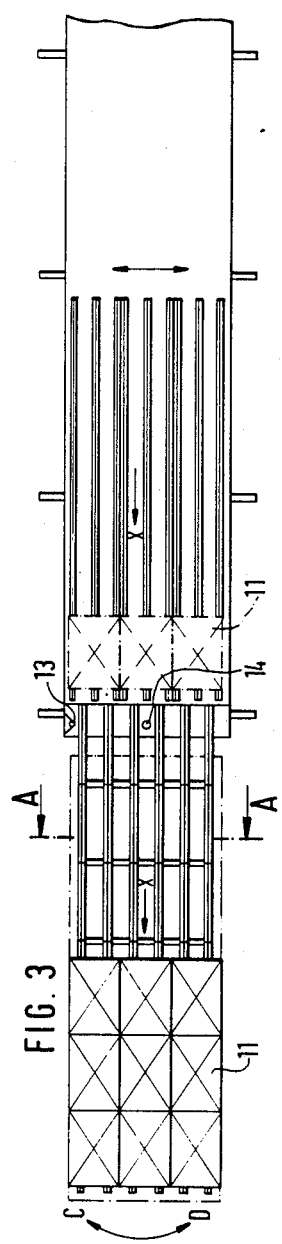
FIG. 1
FIG. 2
FIG. 3

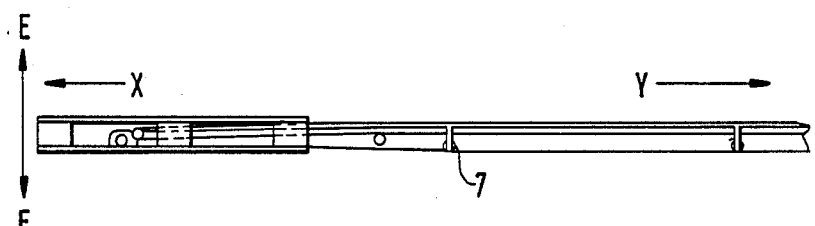
FIG. 4
FIG. 5
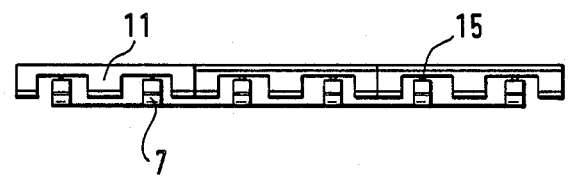

LOADING AND UNLOADING STATION FOR COMMERCIAL VEHICLES AND CONTAINERS

BACKGROUND OF THE INVENTION

The invention relates to a loading and unloading station for commercial vehicles and containers. With standard vehicles, loading is possible only through successive introduction of individual pallets by means of manually operated platform stackers or the like or through lateral loading by means of forklifts. Damage to the material being transported is not infrequent.

SUMMARY OF THE INVENTION

An object of the present invention is to provide a loading and unloading station which makes possible easy and correct loading and unloading of commercial vehicles and and containers.

This object is achieved in accordance with the invention by providing a loading and unloading station for commercial vehicles and containers and consisting of a travelling unit, a chain conveyor or a roller conveyor, and a transport conveyor is characterized by the fact that the transport conveyor and roller conveyor or chain conveyor are swivel-mounted on the travelling unit and can be adjusted in transverse and vertical direction.

Another particularly preferred embodiment is characterized by the fact that the travelling unit is mounted to move by means of rollers on a stationary or travelling supporting structure in the direction of transport "X" and transversely thereto.

Another particularly preferred embodiment is characterized by the fact that the travelling unit is equipped with a lifting mechanism to adjust the height of the chain and of the roller conveyors.

Another particularly preferred embodiment is characterized by the fact that the transport conveyor is provided with support rollers that run transversely to the direction of transport "X".

Another particularly preferred embodiment is characterized by the fact that a height equalizer is mounted on the supporting structure.

These embodiments will now be described in greater detail in conjunction with the accompanying drawings with reference to a particularly preferred embodiment.

BRIEF DESCRIPTION OF THE DRAWINGS

FIG. 1 is a side elevational view of the loading and unloading station outside of the commercial vehicle according to a preferred embodiment of the present invention;

FIG. 2 is a side elevational view of the loading and unloading station of FIG. 1 after it has been run into the commercial vehicle;

FIG. 3 is a top plan view of the loading and unloading station taken from the direction "B" indicated in FIG. 2;

FIG. 4 is an enlarged, partial view of the transport conveyor of FIGS. 1 and 2; and FIG. 5 is a cross-sectional view taken along the line A—A of FIG. 3.

DETAILED DESCRIPTION OF THE PREFERRED EMBODIMENTS

FIG. 1 shows the loading and unloading station outside the commercial vehicle 10 or container. In this embodiment, commercial vehicle 10 has been driven up with its rear to a ramp 9, on which a supporting structure 4 is fixedly or movably mounted. On this supporting structure 4 is mounted a travelling unit 1, which can be moved transversely to the direction of transport "x" and therealong. This is made possible by the rollers 6 mounted on the travelling unit 1.

A first conveyor 2, which may be a roller conveyor or chain conveyor, and a second transport conveyor 3 are located on the travelling unit. The chain conveyor or roller conveyor is equipped with pallets 11. The transport conveyor 3 rests on the height equalizer 8, which, like the lifting mechanism 5 of the travelling unit 1, is brought into line with the loading height.

FIG. 2 shows the loading and unloading station that has been driven into the commercial vehicle 10.

After the chain conveyor or roller conveyor 2 has been supplied with the pallets 11 that are to be shipped, the travelling unit 1 is driven into the commercial vehicle 10 in the direction of transport "X". In the process, the transport conveyor 3 is also pushed into the loading space and is supported during this operation with rollers 7 on the bottom of the vehicle.

When the transport conveyor 3 has reached the end of the loading area, the travelling unit 1 is stopped and the drive 12 of the transport conveyor 3 and of the chain conveyor or of roller conveyor 2 is actuated, thereby transferring the pallets from the chain conveyor or roller conveyor 2 to the transport conveyor 3. As soon as the first pallet 11 has reached the end of the loading area, the travelling unit 1 is moved in the opposite direction of transport "Y". Upon pulling back the transport conveyor 3, the load slides over the sloping end of the transport conveyor 3 onto the loading area of the commercial vehicle 10.

A special feature of the invention is the fact that the reverse speed of the travelling unit 1 corresponds to the transport speed of the transport conveyor 3, that is to say, the load is kept practically in an upright position, so that no jerking motions occur. The unloading occurs in the reverse sequence of the work cycles.

FIG. 3 is a top plan view of the loading and unloading station viewed from the direction B indicated in FIG. 2. In this view are visible the swivel point 13 or the pivots 14.

The transport conveyor 3 can be rotated about the axis of rotation 14 to C or D or, as shown in FIG. 4, can be swung to E or F.

FIG. 5 is a cross-sectional view of the transport conveyor taken along the line A—A of FIG. 3.

Here, the seating of the pallets 11 against the transport segments is shown. The transport conveyor rests with the support rollers 7 on the bottom of the vehicle or container.

-I claim:

1. A loading and unloading station for commercial vehicles and containers comprising:
   a supporting structure,
   a travelling unit independently movable longitudinally and radially on the support structure,
   a first drivable conveyor, and a second drivable transport conveyor both being swivel-mounted on the travelling unit and being adjustable in transverse and vertical directions.

2. The loading and unloading station for commercial vehicles and containers as recited in claim 1, wherein the travelling unit includes rollers which engage the supporting structure for moving the travelling unit in the direction of transport "X" and transversely thereto.

3. The loading and unloading station for commercial vehicles and containers as recited in claim 1, wherein the travelling unit further includes a lifting mechanism for adjusting the height of the first and second conveyors.

4. The loading and unloading station for commercial vehicles and containers as recited in claim 1, further comprising support rollers connected to the second transport conveyor and running transversely to the direction of transport "X", for supporting the second conveyor in a container.

5. The loading and unloading station for commercial vehicles and containers as recited in claim 1, further comprising a height equalizer mounted on the supporting structure for adjusting the height of the second conveyor.

6. The loading and unloading station for commercial vehicles and containers as recited in claim 2 wherein the travelling unit further includes a lifting mechanism for adjusting the height of the first and second conveyors.

7. The loading and unloading station for commercial vehicles and containers as recited in claim 2 further comprising support rollers connected to the second transport conveyor and running transversely to the direction of transport "X", for supporting the second conveyor in a container.

8. The loading and unloading station for commercial vehicles and containers as recited in claim 3 further comprising support rollers connected to the second transport conveyor and running transversely to the direction of transport "X", for supporting the second conveyor in a container.

9. The loading and unloading station for commercial vehicles and containers as recited in claim 2 further comprising a height equalizer mounted on the supporting structure for adjusting the height of the second conveyor.

10. The loading and unloading station for commercial vehicles and containers as recited in claim 3 further comprising a height equalizer mounted on the supporting structure for adjusting the height of the second conveyor.

11. The loading and unloading station for commercial vehicles and containers as recited in claim 4 further comprising a height equalizer mounted on the supporting structure for adjusting the height of the second conveyor.

12. A loading and unloading station for moving pallets into and out of a container having a floor and a rear, comprising:
a supporting structure having a distal end movable into a fixed position adjacent the rear of the container;
a travelling unit movably mounted on the supporting structure for movement in a longitudinal direction towards and away from the vehicle, and transversely to the longitudinal direction;
a first conveyor and a second, transport conveyor mounted on the travelling unit, for moving pallets into the container, the second conveyor having a proximal end connected to the travelling unit and a distal end supported on and slidable over the distal end of the support structure, and being slidable into the container by longitudinal movement of the travelling unit, the travelling unit being slidable away from the container by the conveying action of the second conveyor when a pallet reaches its inner-most position in the container.

13. A loading and unloading station as recited in claim 12, wherein the travelling unit further includes a lifting mechanism for adjusting the height of the first conveyor and the proximal end of the second conveyor to be substantially aligned with the floor of the container.

14. A loading and unloading station as recited in claim 12, further comprising support rollers connected to the second conveyor for supporting the second conveyor on the floor of the container when disposed therein.

15. A loading and unloading station as recited in claim 12, further comprising a height equalizer mounted on the distal end of the supporting structure for adjusting the height of the distal end of the second conveyor to be substantially aligned with the floor of the container.

16. A loading and unloading station as recited in claim 12, wherein the second conveyor is pivotal about a first, vertical axis and a second, horizontal axis, the horizontal axis being transverse the longitudinal direction of movement of the travelling unit.

17. A loading and unloading station as recited in claim 12, wherein the second conveyor has a distal end portion which is sloped to facilitate separation of a pallet from the second conveyor.

* * * * *